United States Patent [19]
Kim

[11] Patent Number: 6,064,455
[45] Date of Patent: *May 16, 2000

[54] BACK LIGHT UNIT, A LIQUID CRYSTAL DISPLAY HAVING A BACK LIGHT UNIT AND A METHOD OF ASSEMBLING A BACK LIGHT UNIT

[75] Inventor: Yong Gyu Kim, Kyungsangbook-do, Rep. of Korea

[73] Assignee: LG Electronics, Inc., Seoul, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 09/036,793

[22] Filed: Mar. 9, 1998

[30] Foreign Application Priority Data

Apr. 10, 1997 [KR] Rep. of Korea .................... P97-13270

[51] Int. Cl.[7] ........................ G02F 1/1335; G02F 1/1333
[52] U.S. Cl. .............................. 349/113; 349/58; 349/60; 349/65; 349/67; 362/31
[58] Field of Search .................................. 349/58, 60, 65, 349/67, 113; 362/31, 26, 27

[56] References Cited

U.S. PATENT DOCUMENTS

| | | | |
|---|---|---|---|
| 3,864,905 | 2/1975 | Richardson | 349/65 |
| 4,043,636 | 8/1977 | Eberhardt et al. | 349/58 |
| 4,958,911 | 9/1990 | Beiswenger et al. | 349/60 |
| 5,207,493 | 5/1993 | Murase et al. | 349/65 |
| 5,262,928 | 11/1993 | Kashima et al. | 349/58 |
| 5,392,199 | 2/1995 | Kashima et al. | 349/58 |
| 5,666,172 | 9/1997 | Ida et al. | 349/58 |
| 5,673,128 | 9/1997 | Ohta et al. | 349/62 |
| 5,796,450 | 8/1998 | Kanda et al. | 349/65 |

*Primary Examiner*—William L. Sikes
*Assistant Examiner*—Kari M. Horney
*Attorney, Agent, or Firm*—Morgan, Lewis & Bockius LLP

[57] ABSTRACT

A back light unit includes a lightguide (#204), a lamp (#202) fastened to one side of the lightguide, a U-shaped argentum reflector (#240) which encompasses the lamp, a reflecting sheet (#203) beneath the lightguide and a frame (#210) positioned under the reflecting sheet. The U-shaped argentum reflector and the reflecting sheet, as separate elements, are attached to form a continuous plane parallel to and along the length of the lightguide without resulting in a step arrangement at the connection. Additionally, the U-shaped reflector and the reflecting sheet are manufactured as separate elements each composed of the same or different materials.

10 Claims, 4 Drawing Sheets

BACK LIGHT UNIT, A LIQUID CRYSTAL DISPLAY HAVING A BACK LIGHT UNIT AND A METHOD OF ASSEMBLING A BACK LIGHT UNIT

This application claims the benefit of Korean patent application No.P97-13270, filed Apr. 10, 1997, which is hereby incorporated by reference.

BACKGROUND OF THE INVENTION

1. Field of the Invention

The present invention relates to a liquid crystal display, and more particularly, to a back light unit used as a light source in a liquid crystal display (LCD), as well as a method for assembling the back light unit.

2. Discussion of the Related Art

A back light unit of a conventional LCD is comprised of a reflecting sheet, a light guide, a diffusing sheet, a lamp and a lamp housing. This back light unit is described below with reference to FIGS. 1 and 2. FIG. 1 is a three-dimensional view showing a back light unit of a conventional LCD. FIG. 2 is a cross-sectional view taken along line II–II' of FIG. 1.

This conventional back light unit includes a reflecting sheet 103, a light guide 104, a diffusing sheet 105, a lamp 102, a U-shaped lamp housing 140 and a frame 110 for fixing these elements. The reflecting sheet 103 is attached to the lower surface of the light guide 104 and the diffusing sheet 105 is attached to the upper surface of the light guide 104. The lamp 102 is placed in the U-shaped lamp housing 140 and fastened to one side of the light guide 104. The U-shaped lamp housing 140 (alternatively referred to as a "reflector") encompasses the lamp 102 and partially encloses one edge of the light guide 104. The lamp housing 140 also reflects light from the lamp 102 to the light guide 104, resulting in most of the light from the lamp 102 being directed to the light guide 104. As described above, the lamp 102 is positioned in a space made by the lamp housing 140 and the light guide 104. The light guide 104 has a diffusing sheet 105 on its upper surface. Each edge of the diffusing sheet 105 may have adhesive materials in order to prevent its detachment from the light guide 104. Reference numeral 109 in FIG. 2 points to a wire coming from the lamp 102. The back light unit which includes the reflecting sheet 103, the light guide 104, the lamp 102 and the lamp housing 140 is fixed by a frame 110 which is formed, for example, by an injection molding of plastics. A liquid crystal display panel 120 includes two substrates which are opposite to each other and have planarization plates on their outer surfaces. This liquid crystal display panel 120 is positioned on the back light unit.

The lamp housing 140 of the back light unit fastens the lamp 102 to one side of the light guide 104 and reflects light transmitted from the lamp 102. As shown in FIG. 2, the lamp housing 140 is made, for example, of hard metal or plastics and partially encloses one edge of the light guide 104. The lamp housing 140 includes a light reflecting element which directs light transmitted from the lamp 102 to the light guide 104.

The procedure for fastening the lamp, the lamp housing and the light guide will now be described with reference to FIG. 3. The lamp 102 is placed in the space within the U-shaped lamp housing 140. If the diameter of the lamp 102 is smaller than this space within the U-shaped lamp housing, then an assistant fastening element encompassing the lamp 102 is provided to prevent motion and provide a stabilizing support of the lamp within the space. One edge of the light guide 104 is enclosed by the lamp housing 140, thereby the lamp 102 is fastened. The lamp housing 140 is placed on the edge of the frame 110. The height of one edge of the light guide 104 enclosed by the lamp housing 140 is preferably the same as the diameter of the lamp 102 to provide a stable fastening. The space made by the U-shaped lamp housing 140 has the same height as the edge of the light guide 104 that is enclosed by the lamp housing. As a result, the light guide 104 can not be put into the lamp housing 140 smoothly, which makes the fastening together of the light guide 104 and the lamp housing 140 time consuming and difficult. When manufacturing a conventional LCD, the step of fastening the lamp housing 140 to the light guide 104 results in an increase in manufacturing time and often results in damaged products.

Further, the frame 110 which fixes the back light unit and the liquid crystal display panel 120 is easily twisted and bent when using the LCD for many hours because the frame 110 of this conventional arrangement is made by the injection molding of plastics. In addition, because of the injection molding procedure used to manufacture this frame 110, it has a predetermined limited width and can not be formed thinner than this limited width. As a result, it is impossible to manufacture a thinner LCD.

SUMMARY OF THE INVENTION

Accordingly, the present invention is directed to a back light unit for a liquid crystal display that substantially obviates one or more of the problems due to limitations and disadvantages of the related art.

An object of the present invention is the provision of a back light unit for a liquid crystal display (LCD) which allows for a reduction in the manufacturing time as well as a reduction in the number of damaged goods by providing a simplified fastening arrangement between a lamp housing and a light guide when manufacturing the LCD having a back light unit.

Another object of the present invention is the provision of an LCD having a thinner frame and which also provides high resistance against heat and surface impact and therefore, is scarcely bent or twisted.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the back light unit includes a light guide; a lamp fastened to one side of the light guide; a U-shaped reflector made of argentum encompassing the lamp; and a frame positioned under the light guide.

In another aspect of the present invention, the liquid crystal display includes a liquid crystal panel; and a back light unit including a light guide, a lamp fastened to one side of the light guide, a U-shaped reflector encompassing the lamp, and a frame positioned under the light guide.

In a further aspect of the present invention, a method of assembling a back light unit includes the steps of connecting a side of a light reflecting sheet to a first edge of a reflector; placing a light guide on the light reflecting sheet; placing a lamp on the reflector bordering one side of the light guide; bending the reflector towards the lamp for attaching a second edge of the reflector to an upper surface of the light guide; and fixing the reflector and the light guide to a frame.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The lamp housing according to the present invention is made of argentum (Ag) which has a relatively high reflectivity and flexibility. For steadily fixing the back light unit, a thin press-frame is used, which is able to resist defects resulting from heat and surface impact.

Figure 1:
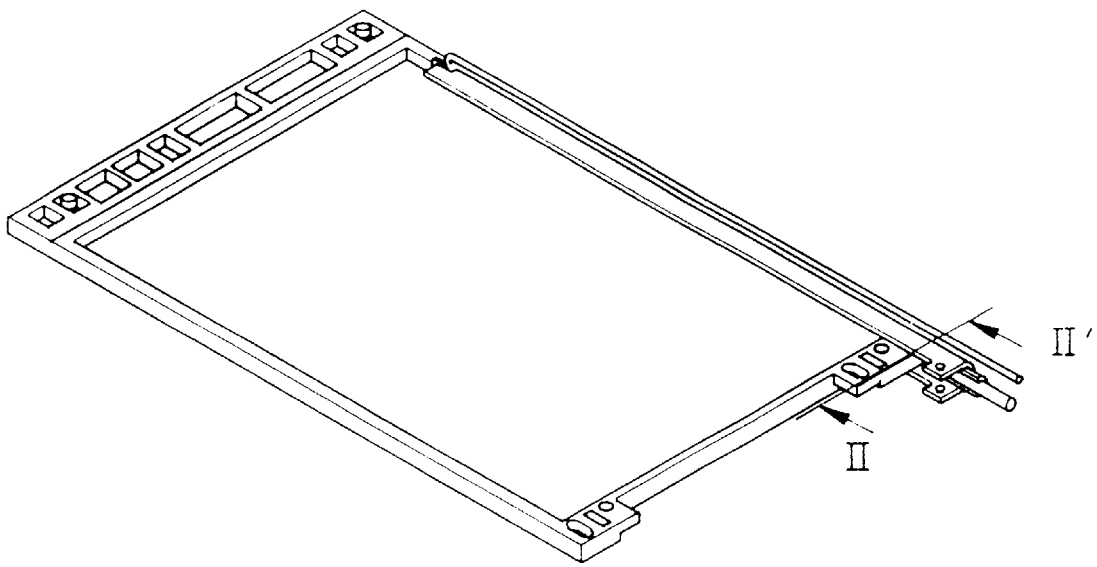
FIG. 1 shows a three-dimensional view of a back light unit of a conventional LCD.
Figure 2:
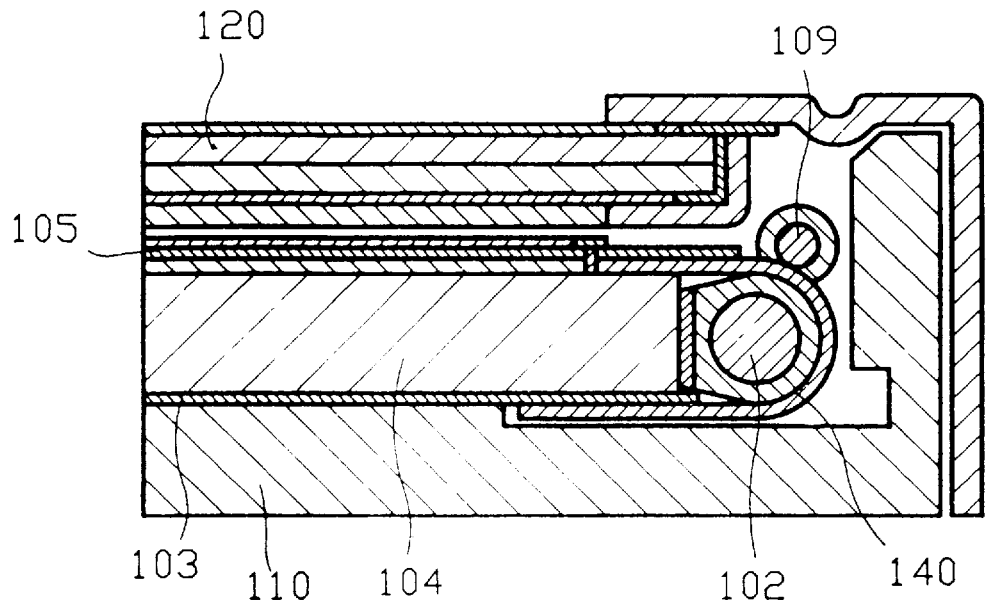
FIG. 2 is a cross-sectional view of the back light unit of the conventional LCD.
Figure 3:
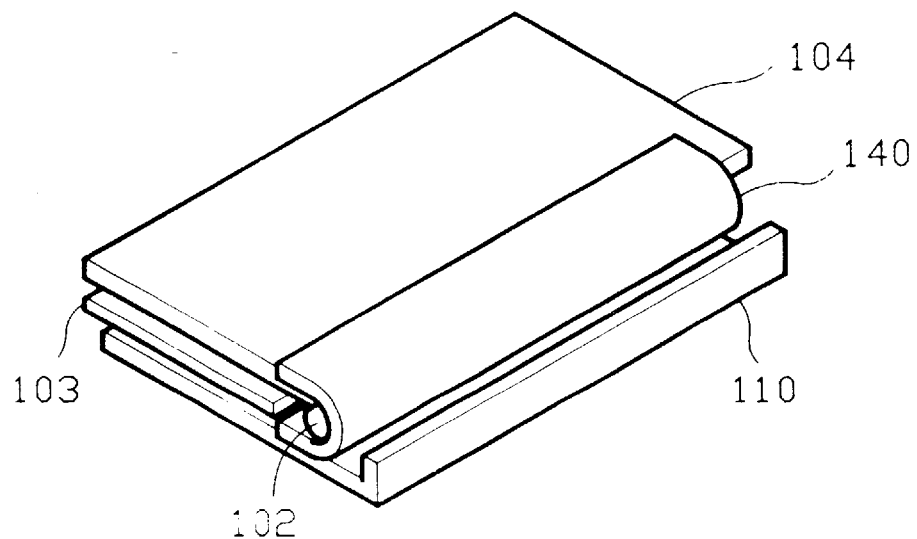
FIG. 3 is a three-dimensional view showing the process of fastening a light guide and a lamp housing in the back light unit of a conventional LCD.
Figure 4:
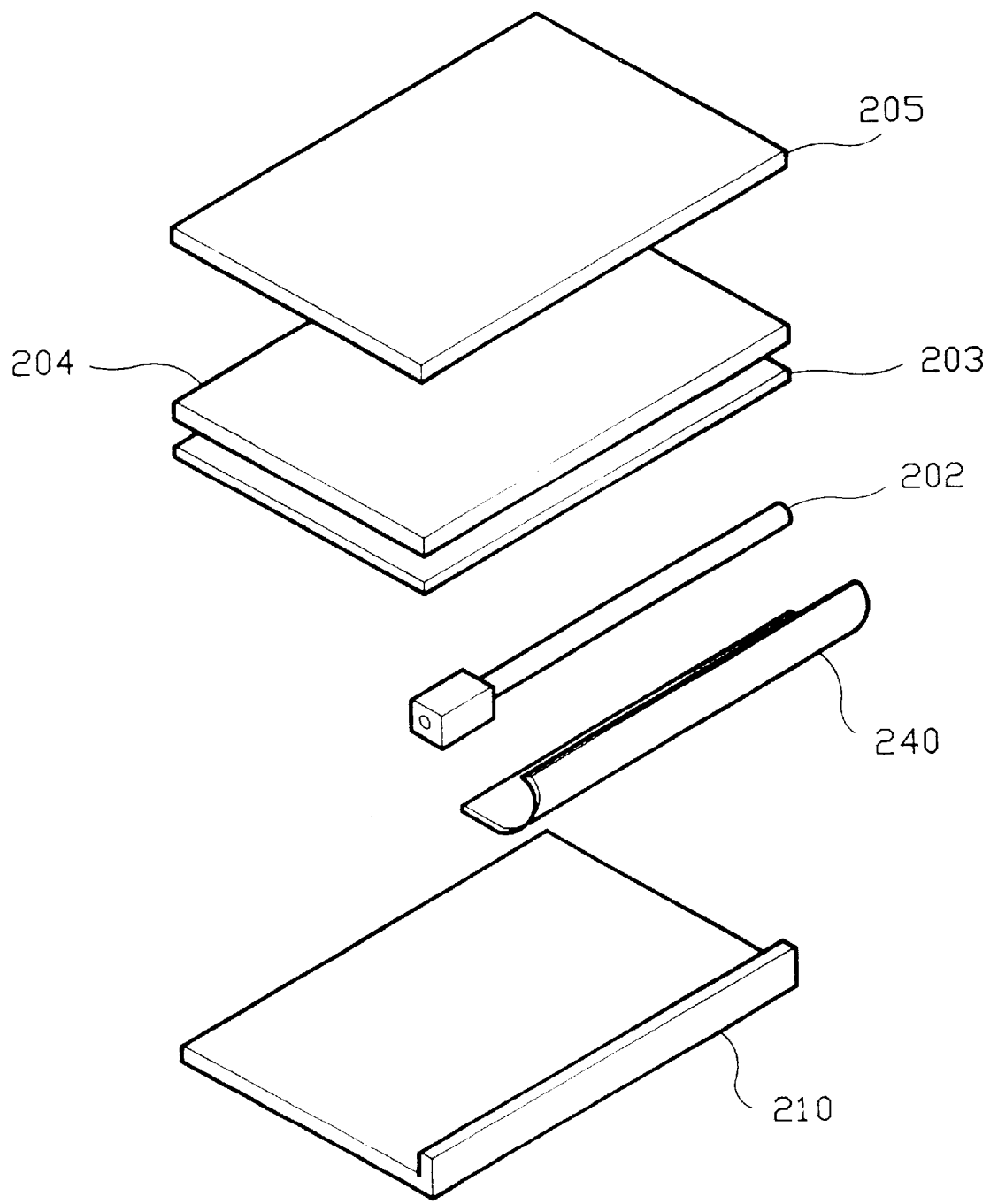
FIG. 4 is a three-dimensional view showing elements of a back light unit of an LCD according to the present invention.

The back light unit according to a preferred embodiment of the present invention is described below with reference to FIGS. 4 and 5. The back light unit includes a light guide 204 positioned on a thin press-frame 210, a lamp 202 which is fastened to one side of the light guide 204, and a U-shaped reflector which is made of Ag and encompasses the lamp 202.

Figure 5:
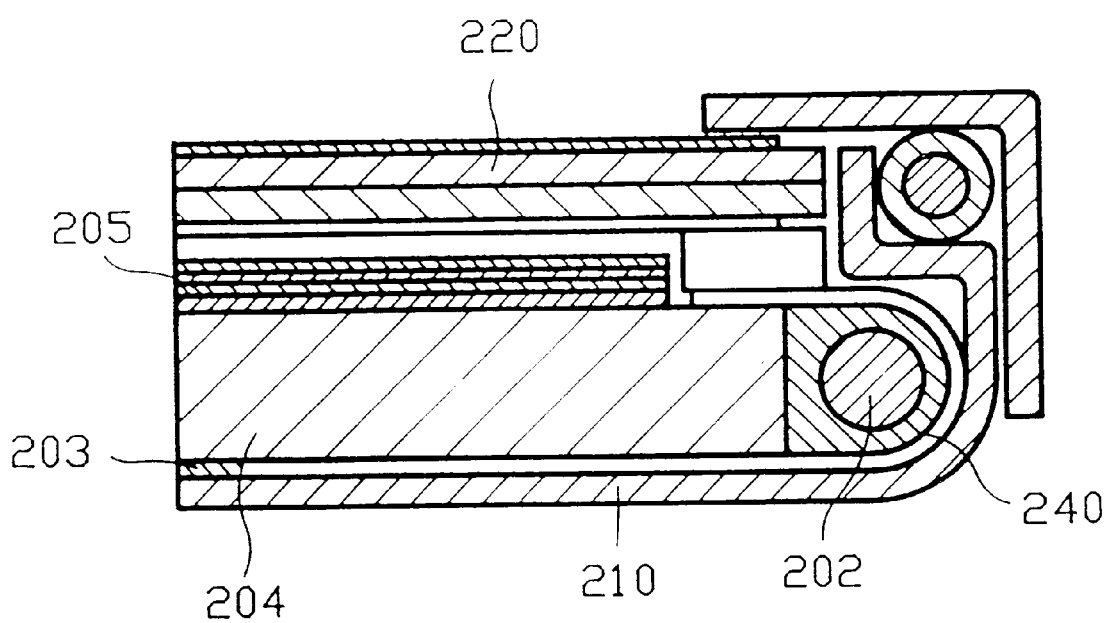
FIG. 5 is a cross-sectional view showing the back light unit of an LCD according to the present invention.

As shown in FIG. 5, a cross-sectional view showing an LCD having a back light unit of the present invention, the LCD includes a liquid crystal display panel 220, a light guide 204, a lamp 202 which is fastened to one side of the light guide 204, a U-shaped reflector 240 which is made of Ag and encompasses the lamp 202, and a frame 210 which is made by a press process and placed under the light guide 204.

A light reflecting sheet 203 is attached to the lower surface of the light guide 204 and a light diffusing sheet 205 is attached to the upper surface of the light guide 204. One edge of the reflector 240 is connected to a side of the light reflecting sheet 203 and the other edge of the reflector 240 is connected to an edge of the light guide 204. The reflector 240 is fixed by a frame 210 and a liquid crystal display panel 220 which is placed on the light diffusing sheet 205. Alternatively, the reflector is fixed using adhesives.

An edge of the reflector 240, alternatively, is connected to the edge of the light diffusing sheet 205 and adhesive materials which are used for fixing the diffusing sheet of the conventional LCD may be used for fastening the reflector 240 to the light diffusing sheet 205. An edge of the reflector 240 may be connected to an edge of the light guide 204 instead of the side of the reflecting sheet 203. A lamp 202 is placed in a space made by the light guide 204 and the reflector 240.

An assembling step of the back light unit for an LCD in accordance with a preferred embodiment of the present invention will now be described in further detail. As an example, one side of the light reflecting sheet 203 is connected to one edge of the reflector 240. The light guide 204 is placed on the reflecting sheet 203. An edge of the reflector 240 is fastened to the edge of the upper surface of the light guide 204. The light diffusing sheet 205 is placed on the light guide 204. The lamp 202 is put into a space made by the light guide 204 and the reflector 240.

In a second preferred embodiment for assembling the back light unit, one side of the light reflecting sheet 203 is connected to an edge of the reflector 240. The light guide 204 is placed on the reflecting sheet 203. The lamp 202 is placed on the reflector 240, bordering one side of the light guide 204.

The reflector 240 is bent toward the lamp 202 and attached to the edge of the upper surface of the light guide 204. In order to fasten the lamp 202 steadily, the lamp 202 is closely encompassed by the reflector 240. The reflector 240 of the present invention has the same functions as the lamp housing of the conventional LCD, i.e., fastening the lamp to the side of the light guide and reflecting light transmitted from the lamp to the light guide.

Alternatively, additional fastening elements made of silicone are attached to both sides of the lamp. Each additional fastening element is put into a corresponding portion of the frame which is shaped in accordance with the outline of the additional fastening element.

The press-frame 210 of the present invention resists twisting, bending or damage due to heat and surface impact in comparison with the plastic frame of the conventional LCD. In addition, the press-frame 210 can be formed as thin as desired. As a result, thinner LCDs can be produced by the present invention.

Thus, the back light unit for an LCD of the present invention includes an Ag reflector sheet which has a relatively high reflectivity and flexibility. The Ag sheet is used for fastening the lamp to the unit and reflecting light transmitted from the lamp to the light guide. Accordingly, it is unnecessary to form a lamp housing at an additional step and manufacturing errors resulting from fastening the prior art lamp housing to the light guide are reduced. As a result of the instant invention's back light unit having an Ag reflector, manufacturing time is reduced and the yield is increased as a result of the ability of the Ag reflector to easily fasten to the light guide during LCD device production.

The present invention thus simplifies the step of fastening the lamp housing to the light guide by using a thin sheet made of argentum (Ag) as the lamp housing. Furthermore, a frame for fixing the lamp housing and the light guide is made of metal instead of plastic, which results in a thinner LCD than the conventional LCD.

The LCD of the present invention has a high resistance to heat and surface impact damage as a result of the lamp housing being made of Ag and the press-frame being made of metal.

It will be apparent to those skilled in the art that various modifications and variations can be made in the back light unit of a liquid crystal display of the present invention without departing from the spirit or scope of the invention. Thus, it is intended that the present invention cover the modifications and variations of this invention provided they come within the scope of the appended claims and their equivalents.

What is claimed is:

1. A back light unit comprising:

a light guide having a top surface and a bottom surface;

a lamp fastened to one side of the light guide;

a light reflecting sheet comprised of a material other than argentum attached to the bottom surface of the light guide;

a U-shaped reflector comprised of argentum and encompassing the lamp, and comprising an element separate from the light reflecting sheet, the U-shaped reflector having first and second edges, the first edge being adapted for attachment to the top surface of the light guide and the second edge being adapted for connection to a side of the light reflecting sheet so that a connection of the U-shaped reflector to the light reflecting sheet forms a continuous plane parallel to and along the length of the light guide without resulting in a step arrangement at the connection; and a frame positioned under the light guide.

2. The back light unit according to claim 1, wherein the frame is a press-frame.

3. The back light unit according to claim 2, wherein the frame includes a metal.

4. A liquid crystal display comprising:

a liquid crystal panel; and a back light unit including:

a light guide having a top surface and a bottom surface, a lamp fastened to one side of the light guide, a light reflecting sheet attached to the bottom surface of the light guide, a U-shaped reflector encompassing the lamp, and comprising an element separate from the light reflecting sheet, the U-shaped reflector having first and second edges, the first edge being adapted for attachment to the top surface of the light guide and the second edge being adapted for connection to a side of the light reflecting sheet so that a connection of the U-shaped reflector to the light reflecting sheet forms a continuous plane parallel to and along the length of the light guide without resulting in a step arrangement at the connection; and a frame positioned under the light guide.

5. The liquid crystal display according to claim 4, wherein the reflector includes argentum.

6. The liquid crystal display according to claim 4, wherein the frame includes a metal.

7. A method of assembling a back light unit comprising the steps of:

connecting a side of a light reflecting sheet to a first edge of a reflector;

placing a light guide on the light reflecting sheet;

placing a lamp on the reflector bordering one side of the light guide;

bending the reflector towards the lamp for attaching a second edge of the reflector to an upper surface of the light guide; and fixing the reflector and the light guide to a frame, wherein the light reflecting sheet and the reflector are manufactured as separate elements each composed of the same or different materials, and are connected together in the back light unit to form a continuous plane parallel to and along the length of the light guide without resulting in a step arrangement at the connection.

8. The method for assembling a back light unit of claim 7, wherein said reflector is made of argentum.

9. The method of assembling a back light unit of claim 7, wherein the frame is made by a press process.

10. The method of assembling a back light unit of claim 7, wherein the frame is formed from a metal.

* * * * *